United States Patent
Cain et al.

[11] Patent Number: 6,033,695
[45] Date of Patent: Mar. 7, 2000

[54] NON-TEMPER, LOW LAURIC FAT COMPOSITIONS

[75] Inventors: Frederick William Cain, Wormerveer; Arie Loots, Enkhuizen; Nico Zwikstra, Wormerveer, all of Netherlands

[73] Assignee: Loders Croklaan B.V., Wormerveer, Netherlands

[21] Appl. No.: 09/210,962

[22] Filed: Dec. 15, 1998

[30] Foreign Application Priority Data

Dec. 15, 1997 [EP] European Pat. Off. .............. 97203926

[51] Int. Cl.⁷ ...................................................... A23D 9/00
[52] U.S. Cl. .............................. 426/89; 426/93; 426/100; 426/101; 426/607
[58] Field of Search .................................. 426/607, 100, 426/101, 89, 93

[56] References Cited

U.S. PATENT DOCUMENTS

| | | | |
|---|---|---|---|
| 4,610,889 | 9/1986 | Schmidt | 426/607 |
| 4,614,663 | 9/1986 | Rule | 426/601 |
| 4,721,626 | 1/1988 | Rule | 426/601 |
| 5,288,513 | 2/1994 | Cain | 426/660 |
| 5,324,533 | 6/1994 | Cain | 426/607 |
| 5,366,752 | 11/1994 | Cain | 426/607 |
| 5,378,486 | 1/1995 | Sullivan | 426/601 |
| 5,424,090 | 6/1995 | Okawauchi et al. | 426/607 |
| 5,439,700 | 8/1995 | Cain | 426/607 |
| 5,576,045 | 11/1996 | Cain | 426/607 |
| 5,587,195 | 12/1996 | Sassen | 426/607 |
| 5,601,860 | 2/1997 | Lien | 426/607 |
| 5,641,528 | 6/1997 | Cain | 426/607 |
| 5,858,427 | 1/1999 | Cain | 426/607 |
| 5,886,037 | 3/1999 | Klor | 426/601 |
| 5,891,495 | 4/1999 | Cain | 426/607 |
| 5,908,654 | 6/1999 | Cain | 426/607 |
| 5,939,114 | 8/1999 | Cain | 426/607 |

FOREIGN PATENT DOCUMENTS

| | | | |
|---|---|---|---|
| 0 464 881 A1 | 1/1992 | European Pat. Off. | A23D 9/00 |
| 0 502 697 A1 | 9/1992 | European Pat. Off. | A23G 1/00 |
| 0 803 196 A1 | 10/1997 | European Pat. Off. | A23D 9/00 |
| WO 95/14392 | 6/1995 | WIPO | A23G 1/00 |

OTHER PUBLICATIONS

Patent Abstracts of Japan, vol. 098, No. 004, Mar. 31, 1998, JP 09 316484 A.

*Primary Examiner*—Carolyn Paden
*Attorney, Agent, or Firm*—Pillsbury Madison & Sutro, LLP

[57] ABSTRACT

Non-temper, low lauric fat blends suitable for coatings contain the following fatty acid residues in the amounts indicated:

10–30 wt % $C12:0$

20–80 wt % total ($C16:0+C18:0$)

30–60 wt % $C18:1$, while the weight ratio $C18:0/C16:0$ ranges from 2–7.

8 Claims, No Drawings

NON-TEMPER, LOW LAURIC FAT COMPOSITIONS

BACKGROUND OF THE INVENTION

In the confectionery area many products are provided with a coating in order to obtain the desired product properties or to enable the use of a filling that can not be used without a coating. Many of these coatings are based on chocolate fats either being cocoa butter or a CBE (=cocoa butter equivalent). However cocoa butter or a CBE contains a lot of polymorphic fats of the SUS type (S=C16/C18 saturated fatty acid; U=Unsaturated C18 fatty acid). These fats have one major drawback ie because of its polymorphic nature the fats need to be subjected to a tempering treatment in order to bring the fats into the desired stable crystal form. This treatment is difficult and expensive and needs a lot of skills. But even then the products obtained often suffer from bloom after a certain storage time.

Well known coating fats that are applied for many years are based on trans fats (ie fats with a relatively high trans fatty acid content), such as Kaomel. Trans fats are nowadays considered as less healthy, reason enough to try to avoid its use if possible.

Kaomel is a midfraction of a mixture of lightly hardened liquid oils, such as cotton seed oil and soybean oil. Although Kaomel has a solid fat content (N-line) which makes it very suitable for application in coatings and it also is a non-temper fat, it thus has the drawback of its relatively high trans content.

An alternative for Kaomel was based on a range of fats with high lauric fat contents. Examples of these fats are palmkernel stearin fractions. However these fats are susceptible to a soapy rancidity and moreover these fats have limited comparability with cocoa butter which limits its possible use in compositions wherein cocoa butter is present.

Therefore we conducted a study in order to find new fat compositions that are useful coating fats, that are substantially free of trans fatty acids (ie <10%, preferably <5%, more preferably <2%), that are non-temper fats ie they can be used without having to perform a tempering and still avoiding the occurrence of bloom. Moreover these fats are low in laurics which is a main advantage because this will avoid the occurrence of rancidity due to the presence of high amounts of lauric fatty acids residues. Moreover these fats can be made from non-tropical fat sources as well. This is in particular relevant in those countries were fats made from tropical fats are not appreciated or even not allowed.

SUMMARY OF THE INVENTION

Therefore our invention in the first instance concerns non-temper, low lauric fat blends suitable for confectionery coatings comprising saturated and mono unsaturated fatty acid residues, wherein the blends comprise:

10–30 wt % of C12:0 and/or C14:0 fatty acids, preferably 12–25 wt % most preferably 14–20 wt %

20–80 wt % of total (C16:0+C18:0) fatty acids, preferably 30–60 wt %, most preferably 40–55 wt %

10–50 wt % of C18:1 fatty acid, preferably 15–35 wt %, while the ratio C18:0C16:0 fatty acids in the blend ranges from 2–7, preferably from 3–5.

Above non-temper fats preferably display a solid fat content as defined by NMR-pulse:

N20 (non stab) >50, preferably >60, most preferably >65
N35 (non stab) <20, preferably <15, most preferably <10
while the ratio between N25 (stab) and N25 (non stab) ranges from 0.7–2.0, preferably from 0.8–1.5, most preferably from 0.9–1.2.

DESCRIPTION OF THE PREFERRED EMBODIMENTS OF THE INVENTION

It is emphasized that the solid fat content of a fat can be measured by a prior art technique called pulsed NMR. Herefore the fat can first be stabilised or not. If the fat is not stabilised the solid fat content will be measured on a fat that was subjected to the following treatment 10 min at 60° C., 60 min at 0° C. and 30 min at measurement temperature.

If however the fat is first stabilised the fat was first subjected to a temperature regime as follows: 10 min at 60° C., 90 min at 0° C., 40 hours at 26° C., 90 min at 0° C. and 60 min at measurement temperature.

The parameter N25 (stab)/N25 (unstab) gives an indication of the non tempering nature of the fat. The closer this value is to 1 the better the non-tempering nature of the fat.

The N20 value gives information about the applicability of the fat at room temperature. Low N20 values would make the coatings unsuitable at room temperature.

The N35 value is important to obtain the required mouth feel.

Although the exact distribution of the fatty acid groups in the fats is not highly relevant we found that very good results could be obtained if this distribution was random in the fats. A random distribution has the advantage that during the preparation of the fats no expensive measures have to be taken in order to obtain directed fatty acid distributions.

Very useful sources for the preparation of our new fats are fatty acid compositions derived from hardened or unhardened high oleic sunflower oil, high oleic soybean oil, high oleic rape seed oil, high lauric rape seed oil, cotton seed oil, or soybean oil, or rape seed oil. A very useful fat is obtained as the mid fraction of the wet fractionation of an interesterified mix of hardened soybean oil or hardened cotton seed oil, preferably hardened to IV<1, hardened palm kernel stearine or hardened high lauric rape seed oil, and a liquid oil such as high oleic sunflower oil. A typical fat obtained from these sources has the following N-profile and fatty acid composition measured by FAME analysis.

| FAME FA | % | N (stab) at T indicated | | N (unstab) at T indicated |
|---|---|---|---|---|
| C12 | 17 | N20 | 70 | 79 |
| C16 | 10 | N25 | 62 | 63 |
| C18 | 39 | N30 | 48 | 40 |
| C18:1 | 21 | N35 | 22 | 10 |
|  |  | N40 | 2 | 0 |

Our new fats are also very good components for confectionery fillings, and in particular for bakery and confectionery applications where the avoidance of a tempering treatment is a great advantage.

EXAMPLES

A feedstock was made by fully interesterifying (with Na-methylate) a blend consisting of 30 wt % fully hardened BO, 33 wt % fully hardened Palm kernel stearin and 37 wt % high oleic Sunflower oil.

400 g of the feedstock was dissolved in 2800 ml warm aceton (50° C.).

A mid fraction was made by fractionation at 0° C., followed by fractionation of the insoluble part at +26° C. (Oil:Acetone 1:5 w/v)

A mid fraction was obtained at 38% yield.

This fat had the N-line as mentioned earlier and the fatty acid pattern:

C12=17%
C16=10%
C18=39%
C18:1=21% trans-content: <2%

EXAMPLE 2

A second feedstock was made by fully interesterifying (with Na-methylate) a blend consisting of 50 wt % fully hardened HLRP, 10 wt % fully hardened CS and 40 wt % HOSF. A double wet fractionation in aceton at 0° C. and +26° C. resulted in a mid fraction with the desired properties:

|     | unstab | stab |           |                 |
| --- | ------ | ---- | --------- | --------------- |
| N20 | 77     | 70   | C12 = 17% |                 |
| N25 | 64     | 63   | C16 = 11% |                 |
| N30 | 38     | 46   | C18 = 38% |                 |
| N35 | 12     | 23   | C18:1 = 21% | trans-content: <2% |

EXAMPLE 3

Example 2 was repeated, however applying as starting mixture 50 wt % fully hardened HLRP, 20 wt % partly hardened CS and 30 wt % HOSF. The product obtained as midfraction had the following properties:

|     | unstab | stab | FAME              |
| --- | ------ | ---- | ----------------- |
| N20 | 78     | 68   | C12 = 19%         |
| N25 | 63     | 61   | C16 = 10%         |
| N30 | 41     | 47   | C18 = 37%         |
| N35 | 11     | 19   | C18:1 = 29%       |
|     |        |      | trans-content: 10% |

Use of the non-temper fat in coatings
The following coating recipe was used:

|            | wt % |
| ---------- | ---- |
| CCP 10/12  | 20   |
| fat        | 32   |
| sugar      | 48   |
| lecithin   | 0.4  |

A coating with good properties was made with the fats according to examples 1 to 3.

We claim:

1. Non-temper, low lauric fat blends suitable for confectionery coatings comprising saturated and mono unsaturated fatty acid residues, wherein the blends comprise:

10–30 wt % of C12:0 and/or C14:0 fatty acids,

20–80 wt % of total (C16:0+C18:0) fatty acids,

10–50 wt % of C18:1 fatty acid, while the ratio C18:0C16:0 fatty acids in the blend ranges from 2–7.

2. Non-temper, low lauric fat blend according to claim 1, wherein the blend displays a solid fat content at the temperature indicated as measured by NMR-pulse of:

N20 (non stab)>50,

N35 (non stab)<20, while the ratio between N25 (stab) and N25 (non stab) ranges from 0.7–2.0.

3. Fat blends according to claim 1 or 2, wherein the fatty acid groups present in the blends are randomly distributed.

4. Fat blends according to any one of claims 1–3 wherein the fatty acids present in the blends are derived from non-tropical fat sources selected from the group consisting of:

hardened or unhardened HOSF, high oleic soybean oil, high oleic rapeseed oil, high lauric rape seed oil, cotton seed oil, or soybean oil, or rape seed oil.

5. Coatings for confectionery products wherein the coating comprises a fat blend according to any one of claims 1–4.

6. Coated confectionery products, wherein the coating is a coating according to claim 5.

7. A fat blend according to claim 1 wherein the blend comprises:

14–20 wt % of C12:0 and/or C14:0 fatty acids;

40–55 wt % of total (C16:0+C18:0) fatty acids;

15–35 wt % of C18:1 fatty acid while the ratio of C18:0/C16:0 fatty acids in the blend ranges from 3–5.

8. A blend according to claim 2 wherein the blend displays a solid fat content at the temperature Indicated as measured by NMR-pulse of:

N20 (non stab)>65

N35 (non stab)<10 while the ratio between N25 (stab) and N25 (non stab) ranges from 0.9–1.2.

* * * * *